Feb. 20, 1962   R. H. PFREHM   3,021,703
PROVING METERS
Filed June 8, 1959   2 Sheets-Sheet 1
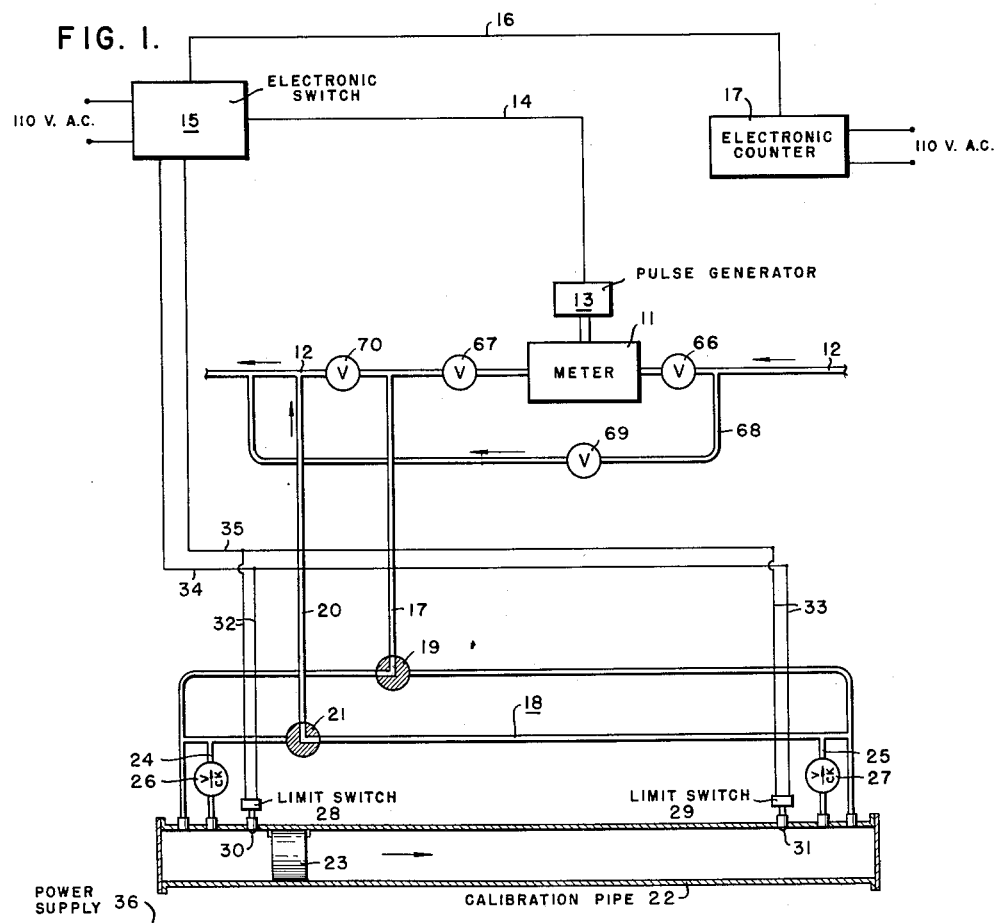
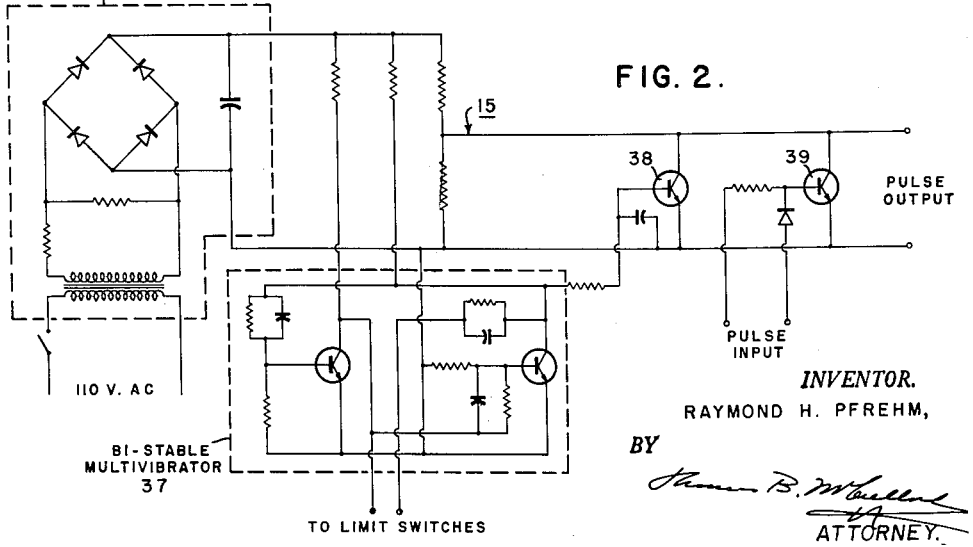
INVENTOR.
RAYMOND H. PFREHM,
BY
*Thomas B. McClellan*
ATTORNEY.

Feb. 20, 1962 R. H. PFREHM 3,021,703
PROVING METERS
Filed June 8, 1959 2 Sheets-Sheet 2
FIG. 5.
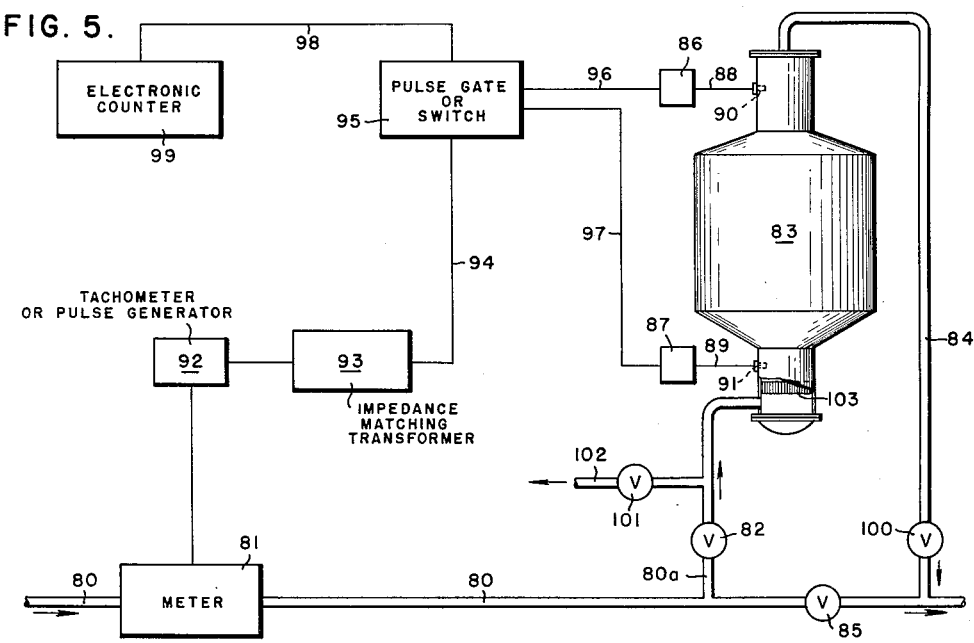
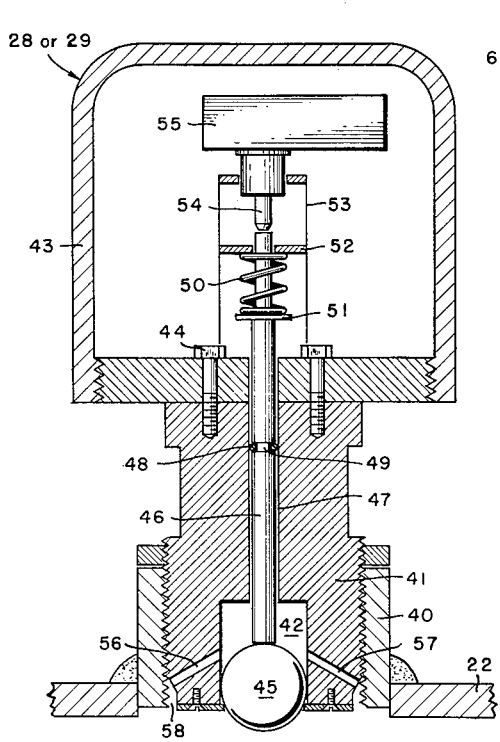
FIG. 3.
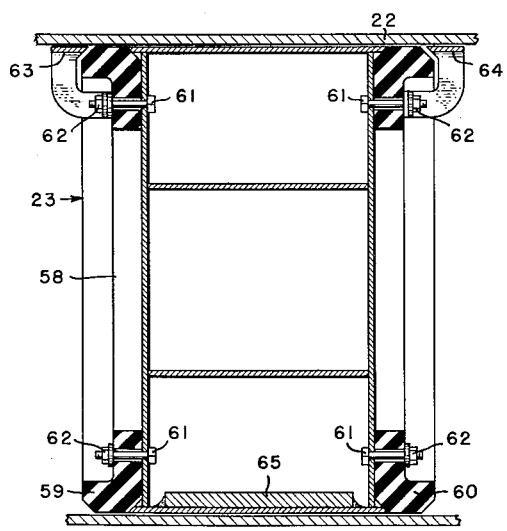
FIG. 4.
INVENTOR.
RAYMOND H. PFREHM,
BY
ATTORNEY

United States Patent Office 3,021,703
Patented Feb. 20, 1962

3,021,703
PROVING METERS
Raymond H. Pfrehm, Houston, Tex., assignor, by mesne assignments, to Esso Research and Engineering Company, Elizabeth, N.J., a corporation of Delaware
Filed June 8, 1959, Ser. No. 818,723
19 Claims. (Cl. 73—3)

The present invention is directed to apparatus for calibrating a meter. More particularly, the invention is directed to apparatus for calibrating a meter in a pipe line under operating conditions while maintaining the meter on stream. In its more specific aspects, the invention is directed to calibration apparatus in which the meter is calibrated accurately with a range of minimum through maximum flow therethrough.

The present invention may be briefly described as apparatus for calibrating a meter such as a positive displacement meter in a pipe line, the apparatus comprising a calibration barrel adapted to be fluidly connected into the pipe line. A pulse generator is operatively connected to the meter and on flow of fluid through the meter, pulses are generated. Electronic switching means are electrically connected to the pulse generator and an electronic counter means is electrically connected to the electronic switching means. Adjacent each end of the barrel and operatively connected thereto are flow-indicating means which are adapted to be actuated by flow of fluid from the pipe line through the calibration barrel whereby pulses from the pulse generator are led into the electronic counter means by sequential actuation of the flow indicating means by flow of fluid from the pipe line through the calibration barrel.

A pipe manifold, in one aspect of the invention, is connected to the calibration barrel for directing fluid flow into the calibration barrel and from the calibration barrel into the pipe line and is provided with valves for directing fluid flow alternatively into each end of the calibration barrel. The manifold is used when a horizontally arranged barrel is employed.

The calibration barrel may be a horizontaally arranged pipe or a vertically arranged tank. In one embodiment, the horizontally arranged pipe is employed with contact switches adapted to be tripped by plug means in the pipe. In another embodiment the plug means is dispensed with and the flow-indicating means comprises liquid level detecting means or sensors.

The plug means employed in one embodiment of the invention may suitably be provided with resilient sealing means on each end thereof and may have metallic tripping plates connected to and leading each of the sealing means for tripping the contact switches.

The electronic switching means comprises a bi-stable multivibrator, transistors, and a power supply to allow rapid switching into the counter and out thereof within about 40 microseconds.

The present invention will be more fully described by reference to the drawing illustrating a preferred embodiment in which:

FIG. 1 shows an arrangement of the apparatus and the flow for calibrating a meter of the positive displacement type;

FIG. 2 is a wiring diagram for the electronic switching means;

FIG. 3 is a sectional view of a switching device;

FIG. 4 is a sectional view of the plug means; and

FIG. 5 is a modification of the embodiment of FIG. 1.

Referring now to the drawing in which identical numerals will be employed to designate identical parts, numeral 11 designates a meter of the positive displacement type arranged in a pipe line 12 in which the flow is indicated by the arrows. Operatively connected to the meter 11 is a pulse generator 13 such as described in Beckman Instruments, Inc. Catalog 705 (1957) which is electrically connected by a lead 14 to an electronic switch 15 in turn connected by electrical leads 16 to an electronic counter 17 which is of a well-known type and is illustrated in Beckman Instruments, Inc. Catalog 705 (1957).

The pipe line 12 is connected by branch line 17 into a manifold 18 by a 3-way valve 19 and the manifold 18 is connected back to the pipe line 12 by branch line 20 leading from the 3-way valve 21. The manifold 18 connects into each end of a calibration pipe or barrel 22 in which is movably and sealingly arranged a pig or plug means 23 which is designed to reciprocate in the barrel 22 and to form a seal with the wall thereof.

Connected into the calibration pipe or barrel 22 are branch lines 24 and 25, each containing a check valve 26 and 27, respectively, which allow flow from the calibration pipe or barrel 22 into the manifold 18 but prevents flow from the manifold 18 into the calibration pipe or barrel 22.

Arranged adjacent each end of the barrel 22 are switches 28 and 29 which project by means of spherical members 30 and 31 into the barrel 22. The limit switches 28 and 29 are connected electrically by electrical leads 32 and 33 and electrical leads 34 and 35 with the electronic switch 15.

Referring to FIG. 2, the electronic switch generally indicated at 15 is comprised of a power supply 36 enclosed by the dotted lines, a bi-stable multivibrator 37, enclosed in the blocked dotted lines, and transistors 38 and 39. The elements 36, 37, 38, and 39 are electrically connected as shown.

The switches 28 and 29 are shown in more detail and in section in FIG. 3, which is an enlarged view thereof and comprises a collar 40 attached to the barrel 22. The collar 40 threadedly receives a block 41 formed to provide a recess 42. The block 41 has a cover 43 threadably connected thereto and the cover 43 is connected by screws 44 to the block 41.

Arranged within the recess 42 is a spherical member 45 which protrudes into the barrel 22 and is urged outwardly from the recess 42 by a shaft or elongated member 46 arranged in the bore 47. The shaft 46 is sealed by an O-ring sealing member 48 in recess 49. The shaft 46 is urged against the spherical member 45 by a spring means 50 bearing against a shoulder 51 and against a plate member 52 in bracket 53 which supports an operative member 54 of the microswitch 55.

The recess 42 has fluid passages 56 and 57 which terminate in a groove 58 for equalization of pressure in the recess 42.

The plug means 23 is a generally cylindrical member 58 having cup-shaped sealing members 59 and 60 on each end thereof formed of a resilient material such as natural or synthetic rubber known to the trade as Hycar. The cup-shaped members 59 and 60 are connected to the cylindrical member 58 by threaded bolts 61 provided with nuts 62.

The upper portion of the plug member 23 has on each end thereof tripping plates 63 and 64 which may be employed to engage with the spherical member 45 to operate microswitches 55 of limit switches 28 and 29. The tripping plates 63 and 64 are suitably attached to the plug member 23 by bolts 61 and nuts 62, shown in the drawing. Plug member 23 may be provided with a weight member 65 mounted on the lower portion thereof to maintain tripping plates 63 and 64 in position for operative relationship with the spherical member 45.

The apparatus of the present invention is quite advantageous and useful and is suitably employed in calibrating a positive displacement meter. For example, with positive displacement meter 11 arranged in the pipe line 12 and flow proceeding in the pipe line 12 as indicated by the arrows, the pulse generator 13 is emitting pulses to the electronic switch 15. By manipulation of the 3-way valves 19 and 21, the fluid flow from the pipe line 11 may be introduced into either end of the calibration barrel 22. Assuming that the fluid flow in the calibration pipe or barrel 22 is in the direction of the arrows, the plug member 23 trips the switch 28 which causes the electronic switch to switch the pulses from generator 13 into the electronic counter 17 and when the plug 23 contacts the switch 31, the electronic switch 15 causes shorting around one of the transistors 38 and 39, effectively blocking the pulses to the counter 17. Thus, with the pulse generator 13 geared to the meter so that it produces a given number of pulses per barrel (for instance, 1,000 pulses per barrel of oil flowing through the meter) the number of barrels shown on the electronic counter shows the amount metered during the travel of the plug from left to right as has been described.

The metered volume may be compared to the known volume of the calibration barrel 22 and by correcting for temperature and pressure, a meter factor can be determined thereby obtaining an accurate calibration of the meter 11. It is to be understood, of course, that the pulse generator may be geared to produce any number of pulses per barrel as may be desired. For example, with a 2-inch meter, 10,000 pulses per barrel may be produced, whereas with an 8-inch meter, 1,000 pulses per barrel may be used.

The present invention is quite advantageous and useful in that the reverse flow through the barrel 22 will allow a check calibration of the meter as may be desired and the meter is not taken off of the pipe line.

In the drawing, and specifically FIG. 1, valves 66 and 67 are provided to allow the meter to be by-passed as desired in part or completely by fluid flow through branch line 68 containing a control valve 69. Likewise, valve 70 allows the flow to be discharged from pipe line 12 into line 17 and allows flow back into pipe line 12 through branch line 20.

Referring now to FIG. 5, a pipe line 80 has a meter 81 of the positive displacement type connected thereinto and a branch line 80a controlled by valve 82 leads into a calibration tank 83. An outlet from the calibration tank 83 is connected into line 84 which, in turn, connects into pipe line 80 for discharge of fluid from the calibration tank. A valve 85 between inlet line 81 and outlet line 84 allows all or part of the flow from pipe line 80 to be routed through calibration tank 83.

Calibration tank 83 is provided with an upper level indication means 86 and a lower level indication means 87 which connect by leads 88 and 89, respectively, to probes 90 and 91 formed in the walls of the tank 83. The probes 90 and 91 are of a vibrating paddle type manufactured by Automation Products, Inc., of Houston, Texas, and marketed under the trade name of "Dynatrol."

The meter 81 has operatively connected thereto a tachometer or pulse generator 92 which, in turn, is electrically connected to an impedance matching transformer 93 which is connected by electrical lead 94 to a pulse gate or electronic switch 95. Liquid level detectors 86 and 87 are also connected into switch 95 by electrical leads 96 and 97. The pulse gate or switch 95 is electrically connected by lead 98 to an electronic counter 99.

In operation, the pipe line flow through meter 81 is discharged into the tank 83 by inlet line 80a and rises in the tank 83 until it contacts the probe 91 which through the liquid level detector 87 causes the electronic switch 95 to feed the pulses from generator 92 into the counter 99. The pulses continue into the counter 99 until the liquid level in the tank 83 reaches the probe 90 and the upper level liquid detector 86 causes the pulse gate or switch 95 to short the pulses which oridinarily are fed to counter 99. Since the volume of the tank 83 between the probes 91 and 90 is known, the pulses from the generator 92 are a measure of the volume passing through the meter 81.

When it is desired to drain the tank 83, the valve 82 in line 80a would be closed and also valve 100 in line 84 would be closed. Valve 101 in branch line 102 is open, which will allow the fluid from tank 83 to be drained off into tankage or back into the pipe line 80. Arranged in the lower end of tank 83 adjacent the inlet 81 is a tube bundle 103 which functions as a turbulence suppressing means. Turbulence may also be suppressed by inducing a swirl to the fluid introduced to the tank 83 and by mounting stream straightening vanes over the induced swirl inlet. Employment of turbulence suppressing means enhances accuracy of the device.

The devices of FIGS. 1 and 5 have been used successfully in calibrating meters such as 11 and 81 employed in a commercial pipe line. The devices are, therefore, quite important and useful.

The nature and objects of the present invention having been completely described and illustrated, what I wish to claim as new and useful and secure by Letters Patent is:

1. Apparatus for calibrating a meter in a pipe line which comprises a calibration barrel separate from and adapted to be fluidly connected into said pipe line, a plug means movably arranged in said calibration barrel to form a seal with the wall thereof, a pulse generator operatively connected to said meter for generating pulses by fluid flow through said meter and pipe line, switching means electrically connected to said pulse generator, counter means electrically connected to said switching means, and contact switches adjacent each end of and projecting into said calibration barrel electrically connected to said switching means and adapted to be tripped by reciprocal motion of said plug means whereby pulses from said pulse generator are led into said counter means by sequential tripping of said contact switches on reciprocal motion of said plug means by flow of fluid from said pipe line through said calibration barrel.

2. Apparatus for calibrating a meter in a pipe line which comprises a calibration barrel separate from and adapted to be fluidly connected into said pipe line, a plug means movably arranged in said calibration barrel to form a seal with the wall thereof, a pulse generator operatively connected to said meter for generating pulses by fluid flow through said meter and pipe line, an electronic switching means electrically connected to said pulse generator, an electronic counter means electrically connected to said electronic switching means, and contact switches adjacent each end of and projecting into said calibration barrel electrically connected to said electronic switching means and adapted to be tripped by reciprocal motion of said plug means whereby pulses from said pulse generator are led into said electronic counter means by sequential tripping of said contact switches on reciprocal motion of said plug means by flow of fluid from said pipe line through said calibration barrel.

3. Apparatus for calibrating a meter in a pipe line which comprises a calibration barrel separate from and adapted to be fluidly connected into said pipe line, a pipe manifold connected to said pipe line and to said calibration barrel for directing fluid flow into said calibration barrel and from said calibration barrel into said pipe line, a plug means movably arranged in said calibration barrel to form a seal with the wall thereof, a pulse generator operatively connected to said meter for generating pulses by fluid flow through said meter and pipe line, an electronic switching means electrically connected to said pulse generator, an electronic counter means electrically connected to said electronic switching means, and contact switches adjacent each end of and projecting into said calibration barrel electrically connected to said electronic switching means and adapted to be tripped by reciprocal motion of said plug means whereby pulses from said pulse generator are led into said electronic counter means by sequential tripping of said contact switches on reciprocal motion of said plug means by flow of fluid from said pipe line through said calibration barrel.

4. Apparatus in accordance with claim 3 in which said pipe manifold is provided with valves for directing fluid alternately into each end of said calibration barrel.

5. Apparatus for calibrating a meter in a pipe line which comprises a calibration barrel separate from and adapted to be fluidly connected into said pipe line, a plug means movably arranged in said calibration barrel to form a seal with the wall thereof, a pulse generator operatively connected to said meter for generating pulses by fluid flow through said meter and pipe line, an electronic switching means comprising a bi-stable multivibrator, transistors and a power supply for said electronic switching means electrically connected to said pulse generator, an electronic counter means electrically connected to said electronic switching means, and contact switches adjacent each end of and projecting into said calibration barrel electrically connected to said electronic switching means and adapted to be tripped by reciprocal motion of said plug means whereby pulses from said pulse generator are led into said electronic counter means by sequential tripping of said contact switches on reciprocal motion of said plug means by flow of fluid from said pipe line through said calibration barrel.

6. Apparatus for calibrating a meter in a pipe line which comprises a calibration barrel separate from and adapted to be fluidly connected into said pipe line, a plug means movably arranged in said calibration barrel to form a seal with the wall thereof, said plug means being provided with resilient sealing means on each end thereof and having metallic tripping plates connected to and leading each of said sealing means, a pulse generator operatively connected to said meter for generating pulses by fluid flow through said meter and pipe line, an electronic switching means electrically connected to said pulse generator, an electronic counter means electrically connected to said electronic switching means, and contact switches adjacent each end of and projecting into said calibration barrel electrically connected to said electronic switching means and adapted to be tripped by reciprocal motion of said plug means whereby pulses from said pulse generator are led into said electronic counter means by sequential tripping of said contact switches by contact with said tripping plates on reciprocal motion of said plug means by flow of fluid from said pipe line through said calibration barrel, said tripping plates being carried by said plug means adjacent the wall of said calibration barrel and said plug means being provided with means for maintaining said tripping plates in operative position for tripping said contact switches.

7. Apparatus for calibrating a meter in a pipe line which comprises a calibration barrel separate from and adapted to be fluidly connected into said pipe line, a pulse generator operatively connected to said meter for generating pulses by fluid flow through said meter and pipe line, an electronic switching means electrically connected to said pulse generator, an electronic counter means electrically connected to said electronic switching means, flow indicating means adjacent each end of and operatively connected into said calibration barrel, said flow indicating means being electrically connected to said electronic switching means whereby pulses from said pulse generator are led into said electronic counter means by actuation of said flow indicating means by flow of fluid from said pipe line through said calibration barrel.

8. Apparatus in accordance with claim 7 in which the calibration barrel is a vertically arranged tank.

9. Apparatus in accordance with claim 7 in which the calibration barrel is a horizontally arranged pipe.

10. Apparatus in accordance with claim 7 in which the flow indicating means comprise liquid level indicators.

11. Apparatus in accordance with claim 7 in which the flow indicating means comprise contact switches adapted to be tripped by a plug means in said barrel.

12. Apparatus for calibrating a meter in a pipe line which comprises a vertically arranged calibration tank separate from and adapted to be fluidly connected into said pipe line, a pulse generator operatively connected to said meter for generating pulses by fluid flow through said meter and pipe line, an electronic switching means electrically connected to said pulse generator, an electronic counter means electrically connected to said electronic switching means, first and second liquid level detection means adjacent each end of and operatively connected into said calibration barrel, said detection means being electrically connected to said electronic switching means whereby pulses from said pulse generator are led into said electronic counter means by actuation of said flow indicating means by flow of fluid from said pipe line through said calibration barrel.

13. Apparatus for calibrating a meter in a pipe line which comprises a vertically arranged calibration tank separate from and adapted to be fluidly connected into said pipe line, a pulse generator operatively connected to said meter for generating pulses by fluid flow through said meter and pipe line, an electronic switching means electrically connected to said pulse generator, an electronic counter means electrically connected to said electronic switching means, first and second liquid level sensing probes adjacent each end of and operatively connected into said calibration tank, said sensing probes being electrically connected to said electronic switching means whereby pulses from said pulse generator are led into said electronic counter means by actuation of said flow indicating means by flow of fluid from said pipe line through said calibration tank.

14. Apparatus for calibrating a meter in a pipe line which comprises a vertically arranged calibration tank having an inlet and an outlet and adapted to be fluidly connected into said pipe line by said inlet and outlet, said tank being separate from said pipe line, a pulse generator operatively connected to said meter for generating pulses by fluid flow through said meter and pipe line, an electronic switching means electrically connected to said pulse generator, an electronic counter means electrically connected to said electronic switching means, first and second liquid level detection means adjacent each end of and operatively connected into said calibration tank, said detection means being electrically connected to said electronic switching means, and means adjacent said inlet for suppressing turbulence of fluid introduced thereto from said pipe line, whereby pulses from said pulse generator are led into said electronic counter means by actuation of said flow indicating means by flow of fluid from said pipe line through said calibration tank.

15. Apparatus for calibrating a meter in a pipe line which comprises a calibration barrel separate from and adapted to be fluidly connected into said pipe line, a pulse generator operatively connected to said meter for generating pulses by fluid flow through said meter and pipe line, switching means electrically connected to said pulse generator, counter means electrically connected to said switching means, flow indicating means adjacent each end of and operatively connected into said calibration barrel, said flow indicating means being electrically connected to said switching means whereby pulses from said pulse generator are led into said counter means by actuation of said flow indicating means by flow of fluid from said pipe line through said calibration barrel.

16. Apparatus for calibrating a meter in a pipeline which comprises a calibration conduit separate from said pipeline, reversible means for fluidly connecting said conduit into said pipeline so that a monodirectional flow in said pipeline may be reversed selectively in said conduit by operation of said means, a closely fitting plug means adapted to be propelled in either direction through said conduit by the flowing fluid in said conduit and a pair of spaced control means in said conduit adapted to be actuated respectively to initiate and stop a calibration operation as the plug means passes said control means in sequence in either direction.

17. Apparatus according to claim 16 wherein said control means are connected by electrical conductor means to an electrically operable counter means, said conductor means being selectively reversible to sequentially initiate and stop operation of said counter means upon corresponding actuation of said control means by passage of said plug means in either direction.

18. A system for proving a running meter in a fluid pipeline comprising in combination a calibration conduit, reversible connecting means for establishing fluid flow through said conduit in either direction desired while flow is monodirectional through the pipeline, a substantially fluid-tight plug means adapted to fit and move within said conduit in either direction, a pair of control devices attached to said conduit at spaced points and each comprising a detector and actuating means adapted to perform a control operation upon arrival of said movable plug means thereat, means operable by said running meter for continuously producing a driving force while said meter is running, a recording means adapted to be driven by said force, reversible means connected to said control devices to connect said recording means to said driving force and thereby initiating operation of the recording means as the plug means passes the first of said control means and for disconnecting said recording means from said driving force and thereby stopping said recording means as the plug means passes the second of said control means regardless of the direction of travel of said plug means in said conduit.

19. A combination in accordance with claim 18 wherein each of said control devices comprises an element protruding into said valve and adapted to be displaced outwardly therefrom as said plug means contacts it and movable means associated with said protruding element.

References Cited in the file of this patent

UNITED STATES PATENTS

| | | |
|---|---|---|
| 2,772,561 | Plank et al. | Dec. 4, 1956 |
| 2,792,705 | Barrett | May 21, 1957 |
| 2,887,653 | Myers | May 19, 1959 |